US012654232B2

(12) United States Patent
Ueda et al.

(10) Patent No.: US 12,654,232 B2
(45) Date of Patent: Jun. 16, 2026

(54) TURRET DEVICE

(71) Applicant: DMG MORI CO., LTD., Nara (JP)

(72) Inventors: Toshio Ueda, Nara (JP); Hitoshi Matsuyama, Nara (JP)

(73) Assignee: DMG MORI CO., LTD., Nara (JP)

( * ) Notice: Subject to any disclaimer, the term of this patent is extended or adjusted under 35 U.S.C. 154(b) by 320 days.

(21) Appl. No.: 18/563,174

(22) PCT Filed: May 26, 2021

(86) PCT No.: PCT/JP2021/020050
§ 371 (c)(1),
(2) Date: Nov. 21, 2023

(87) PCT Pub. No.: WO2022/249350
PCT Pub. Date: Dec. 1, 2022

(65) Prior Publication Data
US 2024/0261871 A1      Aug. 8, 2024

(51) Int. Cl.
*B23B 29/24* (2006.01)
*B23Q 11/10* (2006.01)

(52) U.S. Cl.
CPC ............ *B23B 29/242* (2013.01); *B23Q 11/10* (2013.01); *B23B 2250/12* (2013.01);
(Continued)

(58) Field of Classification Search
CPC ............ Y10T 29/5144; Y10T 29/5155; Y10T 82/2587; Y10T 408/37; Y10T 409/303976;
(Continued)

(56) References Cited

U.S. PATENT DOCUMENTS 3,726,363 A * 4/1973 Sussman .............. B23Q 11/103
408/56
5,265,505 A * 11/1993 Frechette ............. B23Q 1/0018
82/159
(Continued)

FOREIGN PATENT DOCUMENTS

CN        211708133 U     10/2020
DE    102015004268 A1    10/2016
(Continued)

OTHER PUBLICATIONS

EPO Machine Translation of DE 102015004268 A1—Keppeler, Manuel; "Tool Turret"; Oct. 6, 2016.*
(Continued)

*Primary Examiner* — Sunil K Singh
*Assistant Examiner* — Michael Vitale

(57) ABSTRACT
An outer cylinder unit (20) of a turret device (1) has a cylindrical housing space (24) in a front side thereof and has a coolant discharge flow path (22) opened as a connection port (22*a*) in an inner peripheral surface (24*a*) of the housing space (24), and the connection port (22*a*) is formed at a predetermined pitch interval in a circumferential direction. A coolant supply mechanism (25) arranged on an end of a shaft unit (10) is disposed in the housing space (24) and an opening of the outer cylinder unit (20) is closed by a lid (39). The coolant supply mechanism (25) includes a reciprocating rod (30) advancing and retracting with respect to the inner peripheral surface (24*a*) of the housing space (24) and a shaft receiving unit (26) supporting the reciprocating rod (30). The reciprocating rod (30) has a supply hole (34, 53) opened in a distal end thereof and has an annular elastic body (50) arranged to surround the opening of the supply hole (34, 53). When the reciprocating rod (30) advances, the elastic body (50) comes into contact with the inner periph-
(Continued)

eral surface (24a) of the housing space (24) to surround the connection port (22a) in the inner peripheral surface (24a).

6 Claims, 5 Drawing Sheets

(52) U.S. Cl.
CPC ..... *B23Q 2220/002* (2013.01); *Y10T 29/5154* (2015.01); *Y10T 409/303976* (2015.01)

(58) Field of Classification Search
CPC ....... Y10S 82/90; B23B 29/242; B23B 29/34; B23B 39/20; B23B 39/205; B23B 2220/002; B23B 2250/12
USPC .................. 29/39, 40; 82/159, 900; 408/35; 409/135
See application file for complete search history.

(56) References Cited

U.S. PATENT DOCUMENTS

| | | | | |
|---|---|---|---|---|
| 9,126,301 | B2 * | 9/2015 | Meidar .................. | B23Q 3/155 |
| 9,393,660 | B2 * | 7/2016 | Meidar .................. | B23Q 39/00 |
| 10,449,645 | B2 * | 10/2019 | Asano ...................... | B23Q 1/40 |
| 11,154,885 | B2 * | 10/2021 | Nath ...................... | B23B 29/242 |
| 2002/0170397 | A1 * | 11/2002 | Sauter ................. | B23Q 1/0009 74/813 L |

| | | | | |
|---|---|---|---|---|
| 2004/0103510 | A1 * | 6/2004 | Sauter .................... | B23Q 39/02 483/30 |
| 2007/0071381 | A1 * | 3/2007 | Neumeier ............ | B23Q 11/123 384/373 |
| 2012/0186053 | A1 * | 7/2012 | Meidar ................. | B23B 29/323 29/39 |
| 2014/0294523 | A1 * | 10/2014 | Ueda ................... | B23B 31/4073 407/47 |
| 2017/0106485 | A1 * | 4/2017 | Kuyo ................... | B23Q 11/005 |

FOREIGN PATENT DOCUMENTS

| | | |
|---|---|---|
| JP | H08141877 A | 6/1996 |
| JP | H11207507 A | 8/1999 |
| JP | 2010214531 A | 9/2010 |
| JP | 2014507291 A | 3/2014 |
| JP | 2014240104 A | 12/2014 |
| JP | 2017019076 A | 1/2017 |
| JP | 2017205861 A | 11/2017 |

OTHER PUBLICATIONS

EPO Machine Translation of JP H08141877 A—Takashita, Jiro; "Coolant Supplying Device For Lathe"; Jun. 4, 1996.*
International Search Report for related Application No. PCT/JP2021/020050; report dated Aug. 17, 2021.
Extended European search report related to Application No. 21943001.4; reported on Mar. 19, 2025.

* cited by examiner

TURRET DEVICE

TECHNICAL FIELD

The present invention relates to a turret device that is provided in a machine tool, and more particularly, relates to a turret device including a coolant supply mechanism.

BACKGROUND ART

A conventionally known turret device including a coolant supply mechanism (coolant supply device) is disclosed in Japanese Unexamined Patent Application Publication No. 2014-240104 (Patent Literature 1 listed below). In the coolant supply device of the disclosed turret device, a piston is put in a piston holder, which is attached to a tool rest body, in such a manner as to be able to protrude from and retract into the piston holder. This turret device is configured to join the piston to a coolant inflow port provided in a rear surface of a turret to supply coolant to a tool.

The positional relationship between an inflow port of the piston holder and the piston is set such that the pressure of coolant supplied into the piston holder from the tool rest body acts on the rear end surface of the piston. The piston has a coolant flow path formed in the center thereof, which penetrates from the rear end surface to the front end surface of the piston.

In this coolant supply device, the pressure of coolant supplied into the piston holder acts on the rear end surface of the piston, so that the piston protrudes toward the rear surface of the turret and the distal end of the piston is pressed against and joined to the coolant inflow port provided in the rear surface of the turret. Consequently, the coolant is supplied into the turret through the coolant flow path formed through the piston.

On the other hand, when the supply of coolant into the piston holder is stopped, the piston is retracted by a biasing force of a compression coil spring arranged in the piston holder. Thereby, the joint between the distal end of the piston and the rear surface of the turret is released and the turret is allowed to rotate.

If there is no liquid-tightness between the distal end of the piston and the rear surface of the turret, it is possible that coolant leaks from between the distal end of the piston and the rear surface of the turret and scatters into an undesirable place. In addition, in a machining area, chips generated in machining may scatter toward the rear surface of the turret. If these chips are caught between the distal end of the piston and the rear surface of the turret, a gap is formed between the distal end of the piston and the rear surface of the turret, which results in coolant leaking from this gap.

As disclosed in Japanese Unexamined Patent Application Publication No. 2017-205861, this issue has been addressed by providing an elastic resin seal ring on the distal end of the piston to provide liquid-tight sealing between the distal end of the piston and the rear surface of the turret.

CITATION LIST

Patent Literature

Patent Literature 1: Japanese Unexamined Patent Application Publication No. 2014-240104
Patent Literature 2: Japanese Unexamined Patent Application Publication No. 2017-205861

SUMMARY OF INVENTION

Technical Problem

However, as described above, chips generated in machining can scatter toward the rear surface of the turret in the machining area. Such chips may be caught between the seal ring provided on the distal end of the piston and the rear surface of the turret. The liquid-tightness between the distal end of the piston and the rear surface of the turret may not be immediately impaired by such catching. However, if the distal end of the piston is repeatedly pressed against and separated from the rear surface of the turret in the state where such catching occurs, the seal ring is gradually damaged and the sealing property thereof is impaired, which results in coolant leaking from the damaged portion of the seal ring.

Further, the seal ring damaged as described above needs to be replaced. However, since the conventional coolant supply device is arranged behind the turret, it is difficult to perform the replacement; therefore, there is a problem that the machine tool has to be stopped for a long period of time.

The present invention has been achieved in view of the above-described circumstances and an object of the invention is to provide a turret device which prevents foreign objects such as chips from being caught in a coolant supply mechanism and enables easy replacement of parts of the coolant supply mechanism.

Solution to Problem

To solve the above-described problem, the present invention provides a turret device including:

a shaft unit that is non-rotatable and has at least one supporting part having an outer peripheral surface of a cylindrical shape; and an outer cylinder unit that includes a hollow polygonal prismatic body having openings at both ends and has, at least on each planar surface of an outer periphery thereof, an attachment surface for attaching a tool thereto, wherein:

the outer cylinder unit has at least one supported part having an inner peripheral surface of a cylindrical shape and is rotatably supported by the shaft unit with the supported part externally fitted on the supporting part of the shaft unit inserted through one of the openings;

the turret device is configured to be able to index each of the attachment surfaces formed on an outer peripheral surface of the outer cylinder unit to a predetermined machining position;

the outer cylinder unit has, on the other opening side, a housing space having an inner peripheral surface of a cylindrical shape and has a coolant discharge flow path opened as a connection port in the inner peripheral surface of the housing space, and the connection port is formed at a predetermined pitch interval in a circumferential direction in correspondence with the attachment surfaces;

a coolant supply mechanism arranged on an end of the shaft unit is disposed in the housing space of the outer cylinder unit and the other opening of the outer cylinder unit is closed by a lid;

the coolant supply mechanism includes:

a reciprocating rod that is disposed along a radial direction and advances and retracts with respect to the inner peripheral surface of the housing space; and a shaft receiving unit that supports the reciprocating rod
in such a manner as to allow the reciprocating rod to
advance and retract and includes a drive unit advanc-
ing and retracting the reciprocating rod;

the reciprocating rod has a supply hole bored along an
axis of the reciprocating rod and opened in a distal end
of the reciprocating rod and has an annular elastic body
arranged on the distal end of the reciprocating rod to
surround the supply hole; and when the reciprocating rod is advanced, the elastic body
comes into contact with the inner peripheral surface of
the housing space to surround the connection port
formed in the inner peripheral surface of the housing
space.

In this turret device, each attachment surface formed on
the outer peripheral surface of the outer cylinder unit is
indexed to the predetermined machining position by the
outer cylinder unit being rotated by an appropriate drive
device. When the outer cylinder unit is indexed, the recip-
rocating rod of the coolant supply mechanism has been
driven and retracted by the drive unit and the elastic body
provided on the distal end of the reciprocating rod is
therefore spaced apart inward in the radial direction from the
inner peripheral surface of the housing space.

With a predetermined attachment surface of the outer
cylinder unit indexed at the machining position, the recip-
rocating rod is advanced by the drive unit of the coolant
supply mechanism, whereby the elastic body provided on
the distal end of the reciprocating rod is brought into contact
with the inner peripheral surface of the housing space to
surround the connection port formed in the inner peripheral
surface of the housing space. Thus, the coolant discharge
flow path formed in the outer cylinder unit and the supply
hole formed in the reciprocating rod communicate with each
other. Consequently, coolant is supplied into the coolant
discharge flow path through the supply hole of the recipro-
cating rod.

Note that the supply hole of the reciprocating rod is
supplied with coolant from a predetermined coolant supply
source through a coolant supply flow path formed in the
shaft unit and connected to the coolant supply source.

In this turret device, the coolant supply mechanism is
disposed in the housing space provided on the side opposite
to the shaft unit in the outer cylinder unit, i.e., provided in
a front surface side of the outer cylinder unit, and the
opening of the housing space (the other opening) is closed
by the lid. Therefore, chips generated in a machining area
are prevented from entering the housing space, which pre-
vents foreign objects such as chips from being caught
between the elastic body provided on the distal end of the
reciprocating rod and the inner peripheral surface of the
housing space. Consequently, leakage of coolant from the
contact between the elastic body and the inner peripheral
surface of the housing space is prevented.

Further, the coolant supply mechanism is disposed in the
housing space formed in the front surface side of the outer
cylinder unit, i.e., formed on the side where an operator
normally performs work. Therefore, when some kind of
trouble occurs in the coolant supply mechanism and the
trouble requires part replacement or any other maintenance
to be performed, the required operation can be performed
easily in a short time by removing the lid.

In the present invention, the turret device may have a
configuration in which:

the drive unit includes:
a piston that is externally fitted on the reciprocating
rod; and a pressure chamber that is formed in the shaft receiving
unit and has the piston inserted therein; and the drive unit is configured to advance the reciprocating
rod by supplying pressure fluid into the pressure cham-
ber on a rear side in an advancing and retracting
direction of the reciprocating rod and retract the recip-
rocating rod by supplying pressure fluid into the pres-
sure chamber on a front side in the advancing and
retracting direction.

Further, in the present invention, the turret device may
have a configuration in which:

the reciprocating rod has a stepped portion on an inter-
mediate portion thereof so as to have a small diameter
on the rear side in the advancing and retracting direc-
tion and a large diameter on the front side in the
advancing and retracting direction;

the shaft receiving unit has an annular contact surface that
comes into contact with an entire surface of a large
diameter portion of the reciprocating rod and provides
sealing in cooperation with the large diameter portion
when the reciprocating rod is retracted and that sepa-
rates from the large diameter portion when the recip-
rocating rod is advanced;

the shaft receiving unit further has a coolant supply
chamber formed in a predetermined area including the
contact surface in the advancing and retracting direc-
tion;

the reciprocating rod has a connection port formed in an
outer peripheral surface thereof on the rear side of the
stepped portion, and the connection port communicates
with the supply hole; and the coolant supply flow path formed in the shaft unit and
connected to the predetermined coolant supply source
is opened in the coolant supply chamber on the front
side of the contact surface in the shaft receiving unit.

In the turret device having this configuration, when the
reciprocating rod is advanced, the large diameter portion
forming the stepped portion is separated from the contact
surface of the shaft receiving unit, so that a gap of a
predetermined distance is formed between the large diam-
eter portion and the contact surface. Thus, the coolant supply
chamber on the rear side of the stepped portion and the
coolant supply chamber on the front side of the stepped
portion communicate with each other through this gap.
Consequently, coolant supplied into the front coolant supply
chamber of the shaft receiving unit through the coolant
supply flow path of the shaft unit from the appropriate
coolant supply source flows into the rear coolant supply
chamber through the gap. The coolant subsequently flows
through the connection port of the reciprocating rod and the
supply hole formed in the reciprocating rod. Thus, coolant is
supplied into the coolant discharge flow path of the outer
cylinder unit.

On the other hand, when the reciprocating rod is retracted,
the entire surface of the large diameter portion forming the
stepped portion is brought into contact with the contact
surface of the shaft receiving unit and they provide sealing
in cooperation with each other, so that the communication
between the coolant supply chamber on the rear side of the
stepped portion and the coolant supply chamber on the front
side of the stepped portion is blocked. Thereby, the supply
of coolant into the supply hole of the reciprocating rod is
shut off; consequently, the supply of coolant into the coolant
discharge flow path of the outer cylinder unit is shut off.

Thus, in the turret device having this configuration, the
path for supplying coolant into the coolant discharge flow path of the outer cylinder unit is opened and closed by the advance and retraction of the reciprocating rod.

Further, in the present invention, it is preferred that the elastic body is detachably mounted via a mounting member on the distal end of the reciprocating rod. With this configuration, the elastic body can be easily replaced when it needs to be replaced.

Further, in the present invention, it is preferred that a front end surface of the elastic body is formed in a convex curved surface having a predetermined curvature. With this configuration, the tightness between the elastic body and inner peripheral surface of the housing space in contact with each other is increased, which more effectively prevents leakage of coolant from between the elastic body and the inner peripheral surface of the housing space.

Further, in the present invention, it is preferred that the supporting part of the shaft unit and the supported part of the outer cylinder unit externally fitted on the supporting part are liquid-tightly sealed therebetween by a sealing member. With this configuration, even if coolant leaks from the contact between the elastic body and the inner peripheral surface of the housing space, the sealing member prevents the coolant from entering other structures provided in the shaft unit.

Advantageous Effects of Invention

As described above, the turret device according to the present invention has the configuration in which the coolant supply mechanism is disposed in the housing space provided in the front surface side of the outer cylinder unit and the housing space is closed by the lid. Therefore, chips generated in a machining area are prevented from entering the housing space, which prevents foreign objects such as chips from being caught between the elastic body provided on the distal end of the reciprocating rod and the inner peripheral surface of the housing space. Consequently, leakage of coolant from the contact between the elastic body and the inner peripheral surface of the housing space is prevented.

Further, the coolant supply mechanism is disposed in the housing space formed in the front surface side of the outer cylinder unit, i.e., formed on the side where an operator normally performs work. Therefore, when some kind of trouble occurs in the coolant supply mechanism and the trouble requires part replacement or any other maintenance to be performed, the required operation can be performed easily in a short time by removing the lid closing the housing space.

DESCRIPTION OF EMBODIMENTS

Hereinafter, a turret device according to a specific embodiment of the present invention will be described with reference to the drawings.

Figure 1:
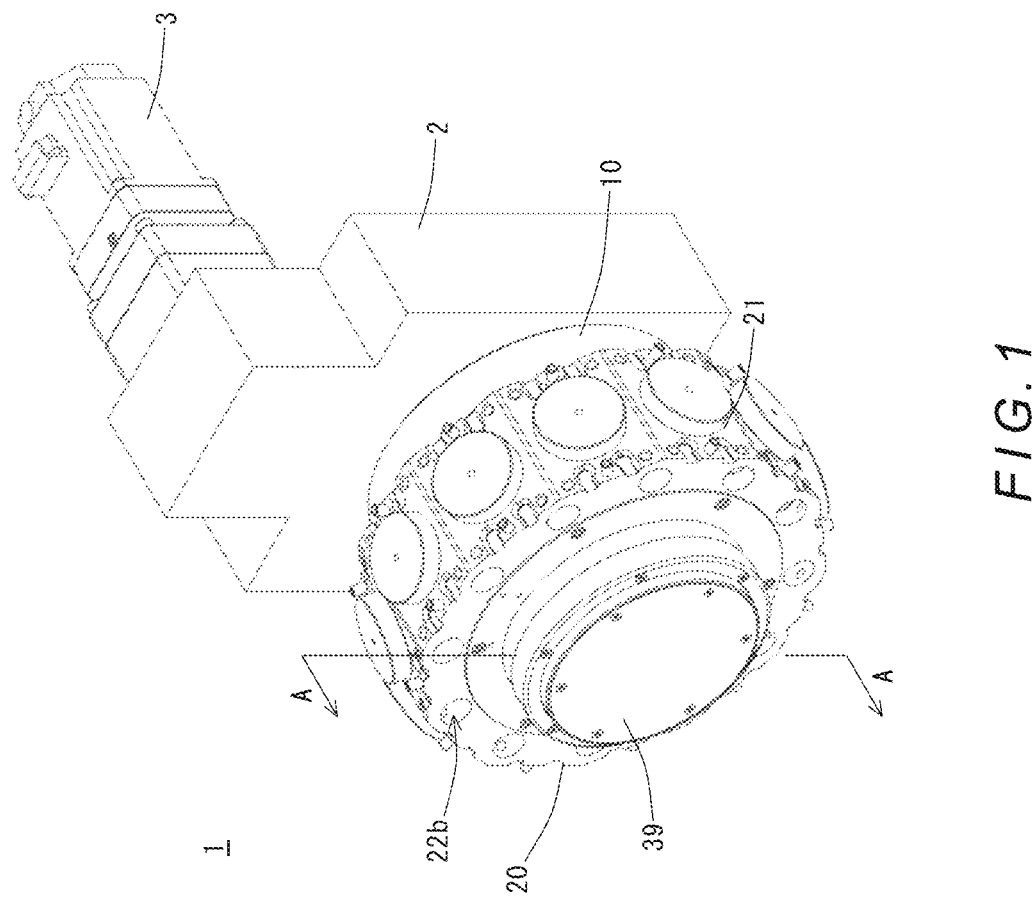
FIG. 1 is a perspective view illustrating a turret device according to an embodiment of the present invention.
Figure 2:
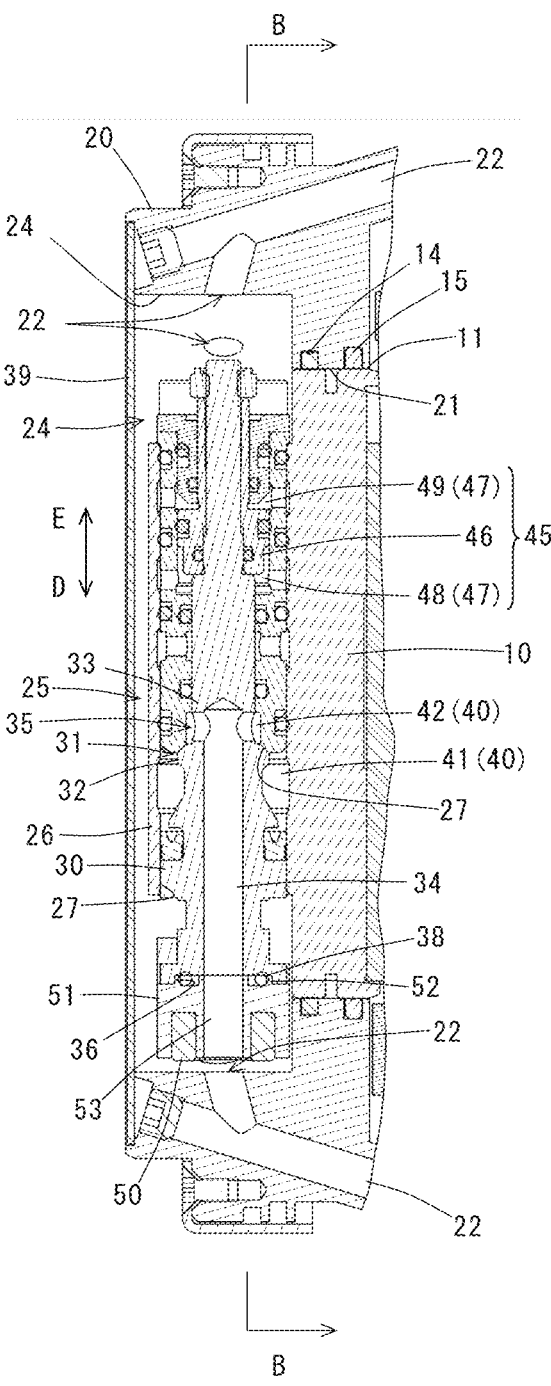
FIG. 2 is a sectional view taken along line A-A in FIG. 1.
Figure 3:
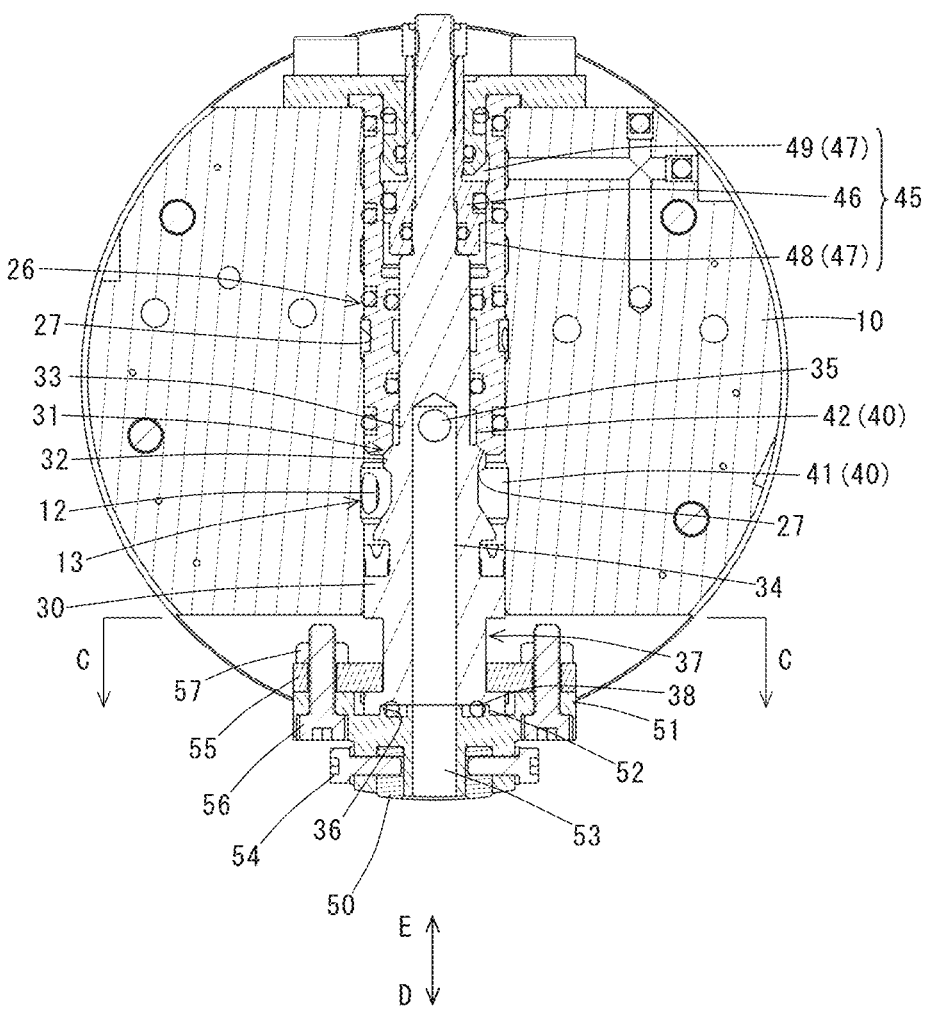
FIG. 3 is a sectional view taken along line B-B in FIG. 2.

The turret device 1 according to this embodiment is provided, for example, in an NC lathe. As illustrated in FIGS. 1 to 3, the turret device 1 has a base 2, a shaft unit 10 arranged on the base 2, an outer cylinder unit 20 rotatably supported by the shaft unit 10, a coolant supply mechanism 25 arranged in the outer cylinder unit 20, a drive motor 3 for rotating the outer cylinder unit 20.

The base 2 is composed of a substantially block-shaped member and is supported in an upright position by an appropriate support base such as a tool rest (not illustrated). The shaft unit 10 is non-rotatably mounted on one end surface (front end surface) of the base 2. The drive motor 3 is arranged on an upper portion of the other end surface (rear surface) of the base 2. The rotational power of the drive motor 3 is transmitted to the outer cylinder unit 20 via a power transmission mechanism arranged in the base 2, whereby the outer cylinder unit 20 is rotated about an axis thereof to be indexed to an appropriate angular position.

The shaft unit 10 has a cylindrical overall shape, and at least one outer peripheral surface thereof functions as a supporting part 11 that supports the outer cylinder unit 20 in such a manner as to allow the outer cylinder unit 20 to rotate. Further, the shaft unit 10 has a coolant supply flow path 12 formed therein that is connected to a predetermined coolant supply source (not illustrated).

The outer cylinder unit 20 is composed of a hollow polygonal prismatic body having openings at both ends. The outer cylinder unit 20 has at least one supported part 21 having an inner peripheral surface of a cylindrical shape. The outer cylinder unit 20 is rotatably supported by the shaft unit 10 with the supported part 21 externally fitted on the supporting part 11 of the shaft unit 10 inserted through one of the openings (rear opening). The supported part 21 and the supporting part 11 are sealed therebetween by two ring-shaped sealing members 14, 15.

Each planar surface of the outer periphery of the outer cylinder unit 20 serves as an attachment surface 21 for attaching a tool thereto. The attachment surfaces 21 are each indexed to a machining position by the outer cylinder unit 20 being rotated by the drive motor 3. In this example, the outer cylinder unit 20 has the attachment surfaces 21 on the outer peripheral surface thereof. However, the present invention is not limited thereto. The outer cylinder unit 20 may have the attachment surfaces on a front end surface thereof.

The outer cylinder unit 20 has a housing space 24 on the other opening (front opening) side. The housing space 24 has an inner peripheral surface 24a of a cylindrical shape and has a diameter larger than those of the supporting part 11 and supported part 21. The outer cylinder unit 20 also has coolant discharge flow paths 22 that are opened as connection ports 22a in the inner peripheral surface 24a. The connection ports 22a are formed at predetermined pitch intervals in the circumferential direction in correspondence with the attachment surfaces 21 and the coolant discharge flow paths 22 are formed in correspondence with the connection ports 22a. The other end of each coolant discharge flow path 22 is connected to a discharge unit 22b arranged on the front end surface of the outer cylinder unit 20. For example, a discharge nozzle included in the discharge unit 22b discharges coolant.

The coolant supply mechanism 25 that is arranged on the front end of the shaft unit 10 is disposed in the housing space 24 of the outer cylinder unit 20. The other opening (front opening) of the outer cylinder unit 20 is closed by a lid 39. In this example, the front end of the shaft unit 10 is positioned in the housing space 24 and the coolant supply mechanism 25 is formed on the front end of the shaft unit 10. However, the present invention is not limited thereto. The coolant supply mechanism 25 may be configured as a structure separate from the shaft unit 10 and attached to a front end surface of the shaft unit 10.

The coolant supply mechanism 25 includes a shaft receiving unit 26 and a reciprocating rod 30. The shaft receiving unit 26 is composed of a cylindrical receiving hole formed along the radial direction of the shaft unit 10 on the front end of the shaft unit 10 positioned in the housing space 24. The reciprocating rod 30 is received by the shaft receiving unit 26 and is able to advance and retract in the direction of arrow D-E with respect to the inner peripheral surface 24a of the housing space 24.

Figure 4:
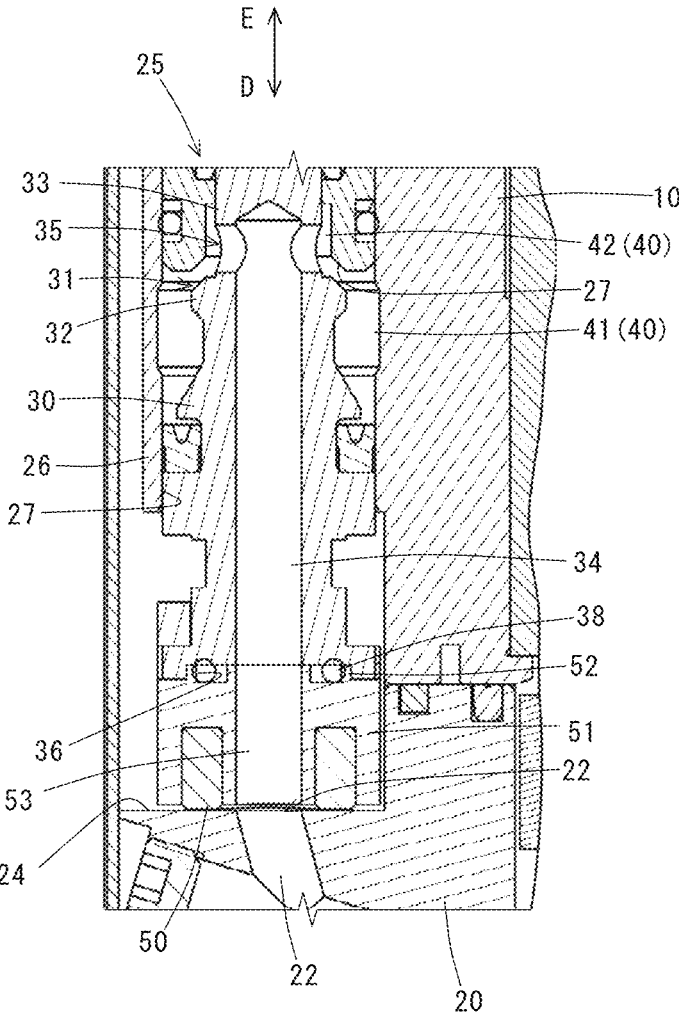
FIG. 4 is an illustrative diagram for explaining operation of a reciprocating rod in the embodiment, showing an enlarged view of an distal end area of the reciprocating rod in FIG. 2.

The reciprocating rod 30 has a supply hole 34 that is bored along the axis of the reciprocating rod 30 and opened in the distal end of the reciprocating rod 30. Further, the reciprocating rod 30 has a stepped portion 31 on an intermediate portion thereof so as to have a small diameter (small diameter portion 33) on the rear side (arrow E side) in the advancing and retracting direction (the direction of arrow D-E) and a large diameter (large diameter portion 32) on the front side (arrow D side) in the advancing and retracting direction. The shaft receiving unit 26 has an annular contact surface 27 (see FIG. 4). When the reciprocating rod 30 is retracted in the direction of arrow E, the contact surface 27 comes into contact with the entire surface of the large diameter portion 32 and provides scaling in cooperation with the large diameter portion 32 (see FIGS. 2 and 3). When the reciprocating rod 30 is advanced in the direction of arrow D, the contact surface 27 separates from the large diameter portion 32.

The shaft receiving unit 26 has a coolant supply chamber 40 that is formed in a predetermined area including the contact surface 27 in the advancing and retracting direction. The reciprocating rod 30 has a connection port 35 formed in an outer peripheral surface thereof on the rear side of the stepped portion 31. The connection port 35 communicates with the supply hole 34. In the shaft receiving unit 26, the coolant supply flow path 12 formed in the shaft unit 10 and connected to the predetermined coolant supply source is opened (opening 13) in a first coolant supply chamber 41, which is located on the front side of the contact surface 27, of the coolant supply chamber 40, and the connection port 35 of the reciprocating rod 30 is located in a second coolant supply chamber 42, which is located on the rear side of the contact surface 27, of the coolant supply chamber 40.

The shaft receiving unit 26 includes a drive unit 45 for advancing and retracting the reciprocating rod 30. The drive unit 45 includes a pressure chamber 47 and a piston 46. The pressure chamber 47 is formed on the rear side of the second coolant supply chamber 42 in the advancing and retracting direction. The piston 46 is externally fitted on the reciprocating rod 30 and inserted in the pressure chamber 47. A pressure chamber (front pressure chamber) 48 located on the front side (arrow D side) of the piston 46 in the advancing and retracting direction and a pressure chamber (rear pressure chamber) 49 located on the rear side (arrow E side) of the piston 46 in the advancing and retracting direction are selectively supplied with pressurized oil through a pressurized oil supply path (not illustrated) formed in the shaft unit 10 and connected to a predetermined pressurized oil supply source. When pressurized oil is supplied into the front pressure chamber 48, the reciprocating rod 30 retracts. When pressurized oil is supplied into the rear pressure chamber 49, the reciprocating rod 30 advances.

The reciprocating rod 30 has a constricted portion 37 formed on a distal end portion thereof. The constricted portion 37 has a diameter smaller than the diameters of the portions located on the front and rear sides thereof. Further, the reciprocating rod 30 has a fitting hole 36 formed in a front end surface thereof. The above-described supply hole 34 is opened in the bottom of the fitting hole 36. The reciprocating rod 30 has a holding member 51 mounted on the distal end thereof. The holding member 51 holds an elastic cylindrical and annular seal body 50 and is mounted on the distal end of the reciprocating rod 30 by a mounting plate 55, mounting bolts 56, and nuts 57.

The holding member 51 has a fitting projection 52 to be fitted in the fitting hole 36. With the fitting projection 52 fitted in the fitting hole 36, the holding member 51 is liquid-tightly mounted on the distal end of the reciprocating rod 30 by means of an O-ring 38. The holding member 51 has a supply hole 53 bored therein that communicates with the above-described supply hole 34. The supply hole 53 is opened in a front end surface of the holding member 51. The front end surface of the holding member 51 has an annular groove formed therein that surrounds the opening of the supply hole 53. The seal body 50 is inserted in this groove and fixed to the holding member 51 by mounting bolts 54 screwed from a side surface of the holding member 51. The seal body 50 has a front end surface formed in a convex curved surface having a predetermined curvature.

Thus, when the reciprocating rod 30 is advanced in the direction of arrow D with the outer cylinder unit 20 indexed appropriately, the seal body 50 provided on the distal end of the reciprocating rod 30 comes into contact with the inner peripheral surface 24a of the housing space 24 to surround the connection port 22a formed in the inner peripheral surface 24a.

Figure 5:
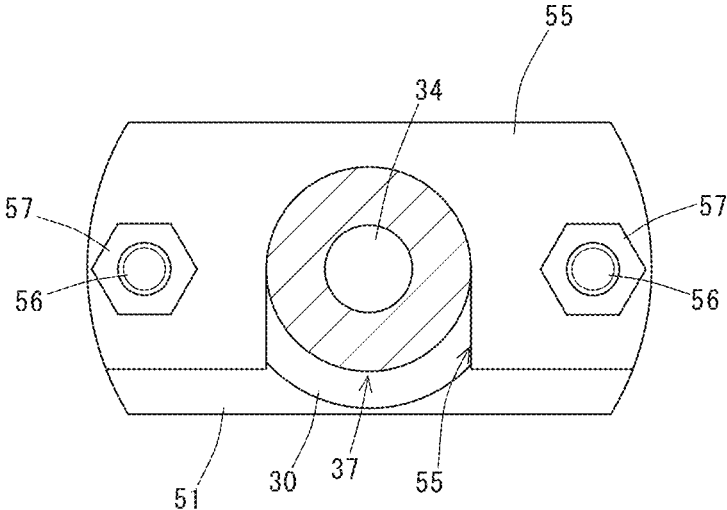
FIG. 5 is a sectional view taken along line C-C in FIG. 3.

As illustrated in FIG. 5, the mounting plate 55 has a U-shaped cutout groove 55a formed therein for inserting the constricted portion 37 therein. With the constricted portion 37 inserted through the cutout groove 55a, the mounting bolts 56 are inserted through the mounting plate 55 from the holding member 51 side and the nuts 57 are screwed and fastened on the mounting bolts 56. Thereby, the holding member 51 is connected in a liquid-tightly contacting manner to the distal end of the reciprocating rod 30.

Note that the screwing allowance for the mounting bolts 56 and the nuts 57 is set to be larger than the fitting allowance for the fitting hole 36 of the reciprocating rod 30 and the fitting projection 52 of the holding member 51. The fitting between the fitting hole 36 and the fitting projection 52 is released by loosening the screwing between the mounting bolts 56 and the nuts 57 to an extent in excess of the fitting allowance for the fitting hole 36 and the fitting projection 52 and then moving the holding member 51 to the front side. Thereafter, an assembly constituted by the holding member 51, the seal body 50, the mounting bolts 54, the mounting plate 55, the mounting bolts 56, and the nuts 57 can be removed from the reciprocating rod 30 in the radial direction opposite to the opening of the cutout groove 55a formed in the mounting plate 55. This assembly can be mounted onto the reciprocating rod 30 by performing the reverse operation.

In the turret device 1 according to this embodiment having the above-described configuration, each attachment surface 21 formed on the outer peripheral surface of the outer cylinder unit 20 is indexed to the predetermined machining position by the outer cylinder unit 20 being rotated by the drive motor 3. In this process, the reciprocating rod 30 of the coolant supply mechanism 25 is retracted and the seal body 50 provided on the distal end of the reciprocating rod 30 is spaced apart inward in the radial direction from the inner peripheral surface 24*a* of the housing space 24.

With a predetermined attachment surface 21 of the outer cylinder unit 20 indexed at the machining position, pressurized oil is supplied into the rear pressure chamber 49 of the coolant supply mechanism 25, so that the reciprocating rod 30 is biased in the direction of arrow D by the pressurized oil and thereby advanced. Consequently, the seal body 50 provided on the distal end of the reciprocating rod 30 comes into contact with the inner peripheral surface 24*a* of the housing space 24 to surround the connection port 22*a* formed in the inner peripheral surface 24*a* (see FIG. 4).

At the same time, the large diameter portion 32 forming the stepped portion 31 of the reciprocating rod 30 is separated from the contact surface 27 of the shaft receiving unit 26 along with the advance of the reciprocating rod 30, so that a gap of a predetermined distance is formed between the large diameter portion 32 and the contact surface 27. Thus, the second coolant supply chamber 42 on the rear side of the stepped portion 31 and the first coolant supply chamber 41 on the front side of the stepped portion 31 communicate with each other through the gap. Consequently, coolant supplied into the first coolant supply chamber 41 of the shaft receiving unit 26 through the coolant supply flow path 12 of the shaft unit 10 from the appropriate coolant supply source flows into the second coolant supply chamber 42 through the gap. The coolant subsequently flows through the connection port 35 of the reciprocating rod 30, the supply hole 34 formed in the reciprocating rod 30, and the supply hole 53 of the holding member 51. Thereafter, the coolant flows through the connection port 22*a* to be supplied into the corresponding coolant discharge flow path 22 (see FIG. 4).

On the other hand, when pressurized oil is supplied into the front pressure chamber 48 of the coolant supply mechanism 25, the reciprocating rod 30 is biased in the direction of arrow E by the pressurized oil and thereby retracted. Consequently, the seal body 50 provided on the distal end of the reciprocating rod 30 is released from the contact with the inner peripheral surface 24*a* of the housing space 24 and moved away inward in the radial direction from the inner peripheral surface 24*a* (see FIGS. 2 and 3).

At the same time, the entire surface of the large diameter portion 32 forming the stepped portion 31 of the reciprocating rod 30 is brought into contact with the contact surface 27 of the shaft receiving unit 26 along with the retraction of the reciprocating rod 30, so that the communication between the second coolant supply chamber 42 on the rear side of the stepped portion 31 and the first coolant supply chamber 41 on the front side of the stepped portion 31 is blocked by the large diameter portion 32 and the contact surface 27 in cooperation with each other. Thereby, the supply of coolant into the supply hole 34 of the reciprocating rod 30 is shut off; consequently, the supply of coolant into the coolant discharge flow path 22 of the outer cylinder unit 20 is shut off (see FIGS. 2 and 3).

Thus, in this embodiment, the path for supplying coolant into the coolant discharge flow path 22 of the outer cylinder unit 20 is opened and closed by the advance and retraction of the reciprocating rod 30.

In this turret device 1, the coolant supply mechanism 25 is disposed in the housing space 24 provided in the front surface side of the outer cylinder unit 20 and the opening of the housing space 24 is closed by the lid 39. Therefore, chips generated in a machining area are prevented from entering the housing space 24, which prevents foreign objects such as chips from being caught between the seal body 50 provided on the distal end of the reciprocating rod 30 and the inner peripheral surface 24*a* of the housing space 24. Consequently, leakage of coolant from the contact between the seal body 50 and the inner peripheral surface 24*a* of the housing space 24 is prevented.

Further, the coolant supply mechanism 25 is disposed in the housing space 24 formed in the front surface side of the outer cylinder unit 20, i.e., formed on the side where an operator normally performs work. Therefore, when some kind of trouble occurs in the coolant supply mechanism 25 and the trouble requires part replacement or any other maintenance to be performed, the required operation can be performed easily in a short time by removing the lid 39.

Further, in this embodiment, the assembly constituted by the holding member 51, the seal body 50, the mounting bolts 54, the mounting plate 55, the mounting bolts 56, and the nuts 57 is mountable on and removable from the distal end of the reciprocating rod 30. Therefore, for example, replacement of the seal body 50 can be performed without turning off the machine tool; consequently, the replacement can be performed easily.

Further, in this embodiment, the front end surface of the seal body 50 is formed in a convex curved surface having a predetermined curvature. Therefore, the tightness between the seal body 50 and inner peripheral surface 24*a* of the housing space 24 in contact with each other is increased, which more effectively prevents leakage of coolant from between the seal body 50 and the inner peripheral surface 24*a* of the housing space 24.

Further, in this embodiment, the supporting part 11 of the shaft unit 10 and the supported part 21 of the outer cylinder unit 20 externally fitted on the supporting part 11 are liquid-tightly sealed therebetween by the seals 14, 15. Therefore, even if coolant leaks from the contact between the seal body 50 and the inner peripheral surface 24*a* of the housing space 24, the coolant is prevented from entering other structures provided in the shaft unit 10.

Above has been described a specific embodiment of the present invention. However, it should be noted that the foregoing description of the embodiment is not limitative but illustrative in all aspects. One skilled in the art would be able to make variations and modifications as appropriate. The scope of the invention is not defined by the above-described embodiment, but is defined by the appended claims. Further, the scope of the invention encompasses all modifications made from the embodiment within a scope equivalent to the scope of the claims.

REFERENCE SIGNS LIST

1 Turret device
10 Shaft unit
12 Coolant supply flow path
20 Outer cylinder unit
22 Attachment surface
23 Coolant discharge flow path
24 Housing space
24*a* Inner peripheral surface
25 Coolant supply mechanism
26 Shaft receiving unit
30 Reciprocating rod
31 Stepped portion
34 Supply hole
35 Connection port
37 Constricted portion
39 Lid
40 Coolant supply chamber 45 Drive unit
46 Piston
47 Pressure chamber
50 Seal body
51 Holding member
55 Mounting plate

The invention claimed is:

1. A turret device comprising:

a shaft unit, the shaft unit being non-rotatable and having at least one supporting part with an outer peripheral surface of a cylindrical shape; and an outer cylinder unit comprising a hollow polygonal prismatic body having openings at opposing ends thereof, the outer cylinder unit having, at least on each planar surface of an outer periphery thereof, a respective attachment surface for attaching a tool thereto, wherein:

the outer cylinder unit has at least one supported part having a corresponding inner peripheral surface of a cylindrical shape, and the outer cylinder unit is rotatably supported by the shaft unit with the at least one supported part externally fitted on the at least one supporting part of the shaft unit which is inserted through a first one of the openings;

the turret device is configured to index each of the attachment surfaces formed on the outer peripheral surface of the outer cylinder unit into a predetermined machining position;

the outer cylinder unit has, on a side of a second one of the openings, a housing space having a corresponding inner peripheral surface of a cylindrical shape and further has a coolant discharge flow path opened as a connection port in the inner peripheral surface of the housing space; the connection port being formed at a predetermined pitch interval in a circumferential direction in correspondence with the attachment surfaces;

a coolant supply mechanism arranged on an end of the shaft unit is disposed in the housing space of the outer cylinder unit, and the second one of the openings of the outer cylinder unit is closed by a lid;

the coolant supply mechanism includes:

a reciprocating rod disposed along a radial direction of the outer cylinder unit and configured to advance and retract with respect to the inner peripheral surface of the housing space; and a shaft receiving unit supporting the reciprocating rod in such a manner as to allow the reciprocating rod to advance and retract, the shaft receiving unit including a drive unit configured to advance and retract the reciprocating rod;

the drive unit includes:

a piston externally fitted onto the reciprocating rod;

a pressure chamber formed in the shaft receiving unit; and by supplying pressure fluid into the pressure chamber on a front side of the piston in an advancing and retracting direction, the reciprocating rod is retracted from the inner peripheral surface of the housing space;

the reciprocating rod has a supply hole bored along an axis of the reciprocating rod and opened in a distal end of the reciprocating rod, and the reciprocating rod has an annular elastic body arranged on the distal end thereof to surround the supply hole; and when the reciprocating rod is advanced, the elastic body comes into contact with the inner peripheral surface of the housing space to surround the connection port formed in the inner peripheral surface of the housing space.

2. The turret device according to claim 1, wherein:

the pressure chamber has the piston inserted therein; and by supplying pressure fluid into the pressure chamber on a rear side of the piston in the advancing and retracting direction, the reciprocating rod is advanced toward the inner peripheral surface of the housing space.

3. The turret device according to claim 1, wherein:

the reciprocating rod has a stepped portion on an intermediate portion thereof and further has a small diameter portion on a rear side in the advancing and retracting direction and a large diameter portion on a front side in the advancing and retracting direction;

the shaft receiving unit has an annular contact surface configured to come into contact with an entire surface of the large diameter portion of the reciprocating rod, wherein the contact surface provides sealing in cooperation with the large diameter portion when the reciprocating rod is retracted, and said contact surface separates from the large diameter portion when the reciprocating rod is advanced;

the shaft receiving unit further has a coolant supply chamber formed in a predetermined area including the contact surface in the advancing and retracting direction;

the reciprocating rod has a connection port formed in an outer peripheral surface thereof on the rear side of the stepped portion, the connection port communicating with the supply hole; and a coolant supply flow path formed in the shaft unit and connected to a predetermined coolant supply source is opened in the coolant supply chamber on the front side of the contact surface in the shaft receiving unit.

4. The turret device according to claim 1, wherein the elastic body is detachably mounted via a holding member on the distal end of the reciprocating rod.

5. The turret device according to claim 1, wherein a front end surface of the elastic body is formed in a convex curved surface having a predetermined curvature.

6. The turret device according to claim 1, wherein the at least one supporting part of the shaft unit and the at least one supported part of the outer cylinder unit externally fitted on the at least one supporting part are liquid-tightly sealed therebetween by a sealing member.

* * * * *